United States Patent

Tsukamoto et al.

Patent Number: 5,835,519
Date of Patent: Nov. 10, 1998

[54] LASER THERMAL PLASMA METHOD

[75] Inventors: Susumu Tsukamoto; Yoshikazu Asai; Kazuo Hiraoka; Hirosada Irie, all of Ibaraki, Japan

[73] Assignee: National Research Institute For Metals, Ibaraki, Japan

[21] Appl. No.: 706,798

[22] Filed: Sep. 3, 1996

[30] Foreign Application Priority Data

Sep. 4, 1995 [JP] Japan .................................. 7-226804

[51] Int. Cl.$^6$ ...................................................... H01S 3/22
[52] U.S. Cl. ............................................................ 372/55
[58] Field of Search ..................................... 372/55, 76, 5, 372/69, 70; 315/111.21

[56] References Cited

U.S. PATENT DOCUMENTS 5,637,962  6/1997  Prono et al. ............................... 372/55

Primary Examiner—Leon Scott, Jr.
Attorney, Agent, or Firm—Wenderoth, Lind & Ponack

[57] ABSTRACT

Focusing laser beams are emitted to a gas plasma produced through discharge and a laser thermal plasma, which is independent of the gas plasma and extends coaxially along the laser beams, is produced in a gas flow space.

4 Claims, 3 Drawing Sheets

LASER THERMAL PLASMA METHOD

BACKGROUND OF THE INVENTION

1. Field of the Invention

The present invention relates to a laser thermal plasma method. More specifically, the present invention relates to a method of producing a stable laser thermal plasma applicable to chemical reactions.

2. Description of the Prior Art

Conventionally, some trials have been made in order to use a thermal plasma as a means for: producing new materials. Plenty of radicals or ions, which are generated by the thermal plasma, would be utilized for synthesis and working of materials. These particles have a high temperature, a high density of electric charge, and a large heat capacity.

An arc discharge and a high-frequency discharge have been well-known as a means for producing the thermal plasma.

There are, however, some deficiencies in these conventional discharges.

For example, in the former, a plasma is contaminated by electrode materials of positive and negative electrodes which are situated at both ends of the plasma. The plasma is also unstable because these electrodes are exhausted and materials are deposited on the surface of the electrodes with the passage of discharge time. In addition, the shape of a plasma is quite dependent on the structure of the discharge electrodes. It is, therefore, difficult to control the shape and temperature distribution of a plasma.

In the latter, a skin effect which is peculiar to the high-frequency discharge occurs so that temperature of a plasma is highest in the surface, but low in the internal portions.

For a process of material synthesis using a plasma, a material is decomposed in the high-temperature portion of the plasma and a reaction takes place in the low-temperature portion. It is desirable that temperature of a plasma is high in the center and low in a wide range around the center. Seen from this point of view, it is difficult to produce a plasma, which has a temperature distribution suitable for such a process of material synthesis, by the high-frequency discharge.

SUMMARY OF THE INVENTION

The present invention has an object to overcome the contamination of a plasma, the exhaustion of electrodes and instability derived from the deposition on the electrodes.

Another object of the present invention is to overcome the skin effect.

Further another object of the present invention is to control the shape and the temperature distribution of a plasma.

These and other objects, features and advantages will be more apparent by reading the following specification and accompanied drawings.

DETAILED DESCRIPTION OF THE PREFERRED EMBODIMENTS

A behavioral analysis of a plasma induced by laser emission, which is formed under the effects of laser beams and the interaction between laser beams and evaporation particles, has been conducted by the inventors. The plasma induced by laser emission has a large temporal fluctuation and therefore its detection by an emission spectral analysis is difficult. The present invention has been made as a result of a research and development for a method of producing a stable plasma induced by laser emission.

The present invention allows a development of a process for synthesizing a new material such as a nonequilibrium material.

In the present invention, an arc discharge, for example, is available for a means for producing a gas plasma through discharge. As far as laser beams are emitted, a laser thermal plasma produced maintains stably even if discharge is extinguished.

An argon gas, an argon-helium mixture gas and a nitrogen gas are available for a plasma gas. A reactive gas would be supplied with such a plasma gas. For such a reactive gas, an oxygen gas, an oxide gas, a nitrogen gas, a nitride gas, a sulphide gas, a halide gas, a chloride gas, an organic compound gas such as a hydrocarbon, and an organo-metallic compound gas are exemplified.

For a laser, a large output type, i.e., a large-output infrared laser would be desirable.

A laser thermal plasma extending coaxially along a laser beam is produced in a gas flow space by emitting focusing laser beams to the gas plasma.

This laser thermal plasma is stable and independent of the gas plasma even if an arc discharge is used. Therefore, the laser thermal plasma overcomes the problems peculiar to the arc discharge, i.e., contamination of a plasma by electrode materials, exhaustion of discharge electrodes and instability of a plasma caused by deposition on the electrodes.

Temperature of the plasma to which focusing laser beams are emitted is high in the center portion and lower with a distance from the center portion. This temperature distribution and the shape of a plasma would be controlled by the output of a laser, a laser emission method and the flow rate of a plasma gas. The problem derived from the skin effect, which is peculiar to the high-frequency discharge, is also dissolved.

Figure 1:
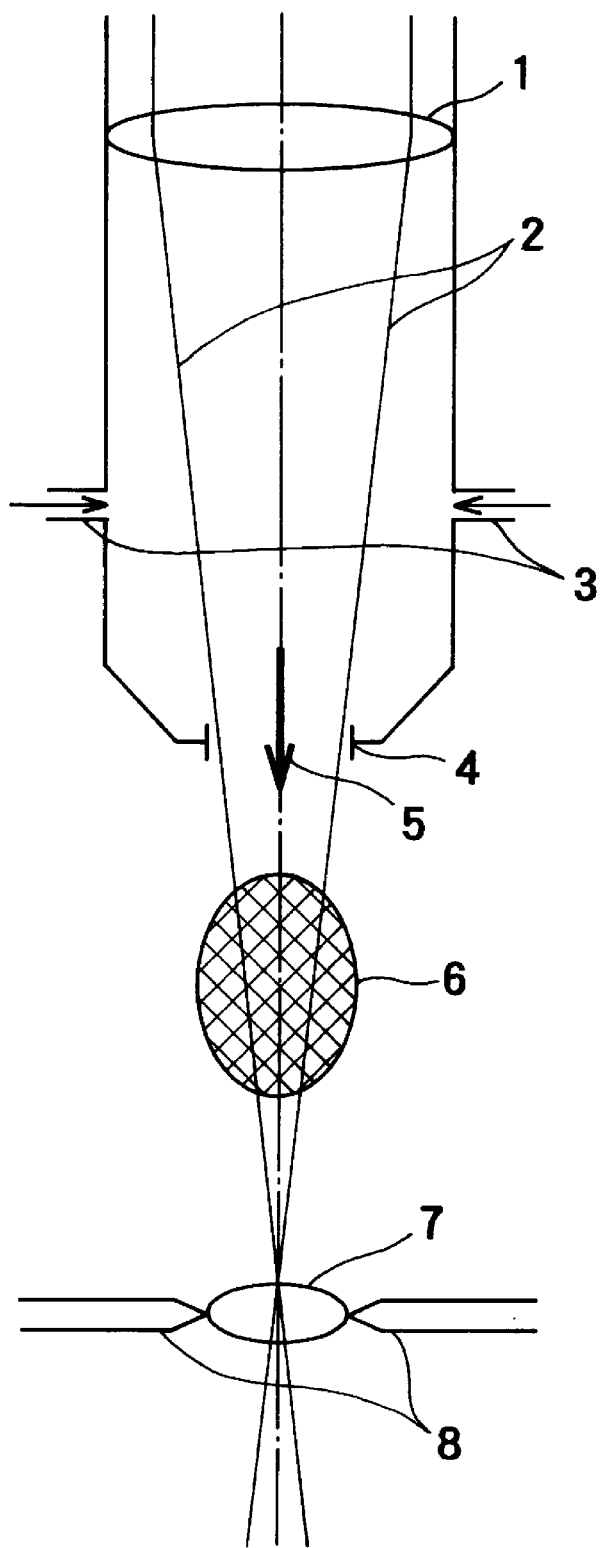
FIG. 1 depicts a schematic view of the present invention.

As shown in FIG. 1, laser beams (2) are focused at around an discharge electrodes (8) through a focusing lens (1). On the other hand, a plasma gas (5) is introduced toward the laser beams (2) from an inlet (3) and flows out through a nozzle (4) coaxially along the laser beams (2). The focusing laser beams (2) are emitted to a gas plasma (7) which is produced between discharge electrodes (8).

A laser thermal plasma (6) is stably produced in a gas flow space above the electrodes (8) under the control of the flow rate of a plasma gas and the output of a laser. The laser thermal plasma (6) is independent of the gas plasma (7). As far as the laser beams are emitted, the laser thermal plasma (6) maintains even after the gas plasma (7) disappears with the extinguishment of discharge.

The laser thermal plasma (6) thus produced can move with the movement of the focusing laser beams (2) and the flow of the plasma gas (5), for example, in the horizontal or vertical direction. The laser thermal plasma (6) is also situated at a described position. The laser thermal plasma (6) is available for synthesis and working of materials.

A reactive gas above-mentioned would be supplied with the plasma gas (5). The reactive gas may be introduced as an atmosphere apart from the flow of the plasma gas (5).

The laser thermal plasma (6) allows synthesis and working of materials such as a production of thin films or fine particles, and a surface modification.

Actually, an argon gas was used for a plasma gas and a carbon dioxide gas laser for a laser. The argon gas was spouted coaxially along laser beams at a flow rate of 15 litters per minute from a gas nozzle with a diameter of 10 mm. Under such an argon atmosphere, focusing carbon dioxide gas laser beams were emitted to the center of an arc plasma produced through arc discharge.

With a laser output of more than 1 kW, a stable laser thermal plasma, which was independent of the arc plasma, was produced on the laser axis and at a distance of about 50 mm above electrodes. The laser thermal plasma stably maintained during laser emission and kept stable after the extinguishment of the arc discharge.

As in the same manner, a laser thermal plasma was produced by using a carbon dioxide gas laser with an output of 3.5 kW and a gas nozzle with a diameter of 10 mm, and by supplying an argon gas at a flow rate of 20 litters per minute.

Figure 2A:
FIGS. 2(a), 2(b) and 2(c) are photos showing production of an arc plasma, production of a laser thermal plasma, and maintenance of the laser thermal plasma, respectively.
Figure 2B:
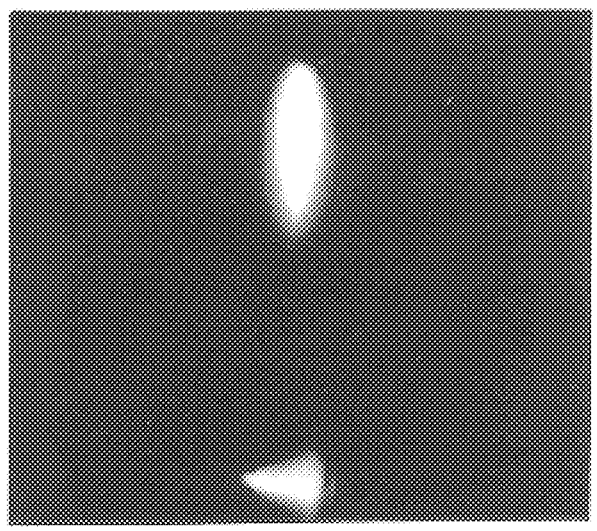
Figure 2C:
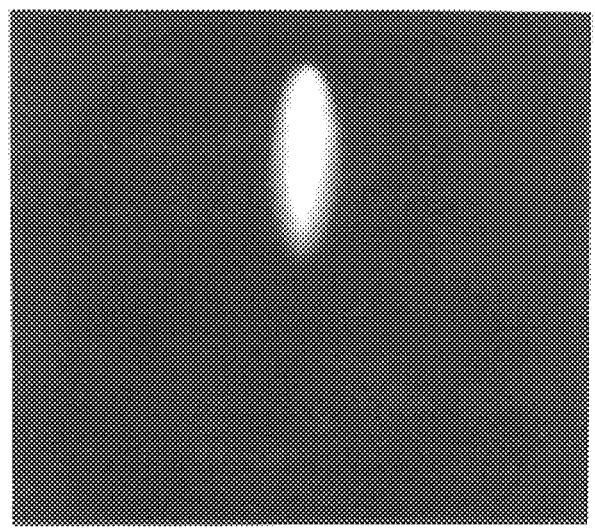

FIGS. 2(a), 2(b) and 2(c) show an arc plasma discharged between electrodes, production of a laser thermal plasma by the laser emission, and maintenance of the laser thermal plasma after the extinguishment of the arc discharge, respectively.

Figure 3:
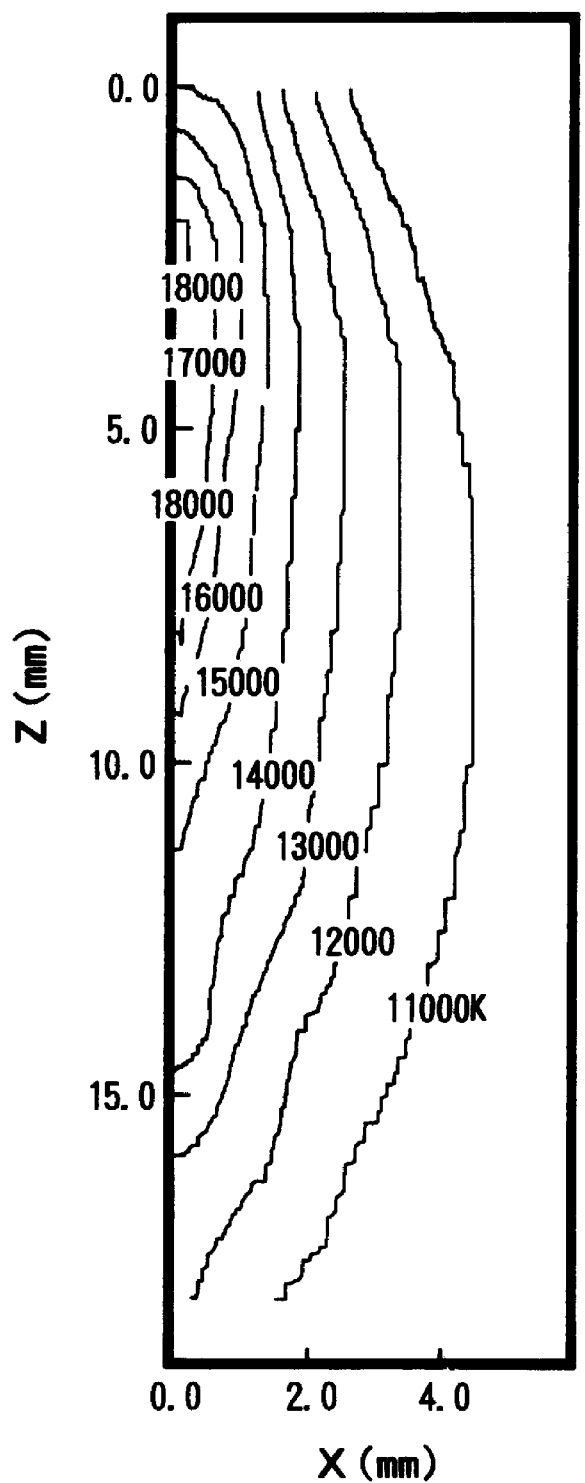
FIG. 3 is a co-relation diaphragm illustrating a temperature distribution of a plasma.

Temperature distributions of the laser thermal plasma were detected. As shown in FIG. 3, it was confirmed that temperature at the center portion of the laser thermal plasma is higher than that at around the center.

As in the same manner, a laser thermal plasma was produced by using a nitrogen gas for a plasma gas. A stable laser thermal plasma was produced with a plasma gas flow rate of 10 litters per minute and a laser output of more than 2 kW. As far as laser beams were emitted, the laser thermal plasma stably maintained even after the extinguishment of arc discharge.

As in the same manner, a laser thermal plasma was produced by using a argon-helium gas with a mixing ratio of 50 to 50. A stable thermal plasma was produced with a plasma gas flow rate of 10 litters per minute and a laser output of more than 3 kW. As far as laser beams were emitted, the laser thermal plasma stably maintained even after the extinguishment of arc discharge.

It is needless to mention that the present invention is not restricted the embodiments mentioned in the above.

What is claimed is:

1. A method of producing a laser thermal plasma, comprising the steps of producing a gas plasma through discharge, emitting focusing laser beams to said gas plasma, and producing a laser thermal plasma in a gas flow space, said laser thermal plasma being independent of the gas plasma and extending coaxially along said laser beams.

2. The method claimed in claim 1, comprising another step of extinguishing said discharge after production of the laser thermal plasma, while maintaining laser emission.

3. The method claimed in claim 2, comprising further another step of synthesizing or working a material with the laser thermal plasma.

4. The method claimed in claim 1, comprising further another step of synthesizing or working a material with the laser thermal plasma.

* * * * *